United States Patent [19]

Hampshire et al.

[11] 3,990,491

[45] Nov. 9, 1976

[54] SAFETY SUPPORT DEVICE AND RIM FOR PNEUMATIC TIRES

[75] Inventors: William J. Hampshire, Peninsula; George T. Watts, Canton, both of Ohio

[73] Assignee: The Goodyear Tire & Rubber Company, Akron, Ohio

[22] Filed: Aug. 19, 1974

[21] Appl. No.: 498,509

[52] U.S. Cl. .............................. 152/158; 152/330 L
[51] Int. Cl.² .......................................... B60C 17/04
[58] Field of Search ................ 152/158, 152, 9, 81, 152/330 RF, 330 L

[56] References Cited
UNITED STATES PATENTS

| 3,635,273 | 1/1972 | Patecell | 152/158 |
| 3,872,907 | 3/1975 | Curtiss, Jr. et al. | 152/158 |

FOREIGN PATENTS OR APPLICATIONS

| 2,345,367 | 9/1973 | Germany | 152/158 |
| 956,380 | 1/1957 | Germany | 152/158 |
| 1,359,461 | 7/1974 | United Kingdom | 152/330 L |

*Primary Examiner*—Drayton E. Hoffman
*Attorney, Agent, or Firm*—F. W. Brunner; P. E. Milliken

[57] ABSTRACT

A safety or emergency insert device positioned on a wheel rim inside a tire chamber to support the tire in a deflated condition. The device has an annular ring member of substantially C-shaped cross section which member has a rim-engaging portion, an axially extending tire tread support portion and a curved intermediate portion joining the rim-engaging portion with one lateral edge of the tire tread support portion. The tread support portion is radially deflectable when a radial load is applied thereto by the weight of a vehicle when the tire surrounding the device is deflated. The annular ring member is made preferably of resilient plastic, spring steel or other suitable resilient material which will provide deflection when the support device is supporting a vehicle running on a flat tire.

31 Claims, 22 Drawing Figures

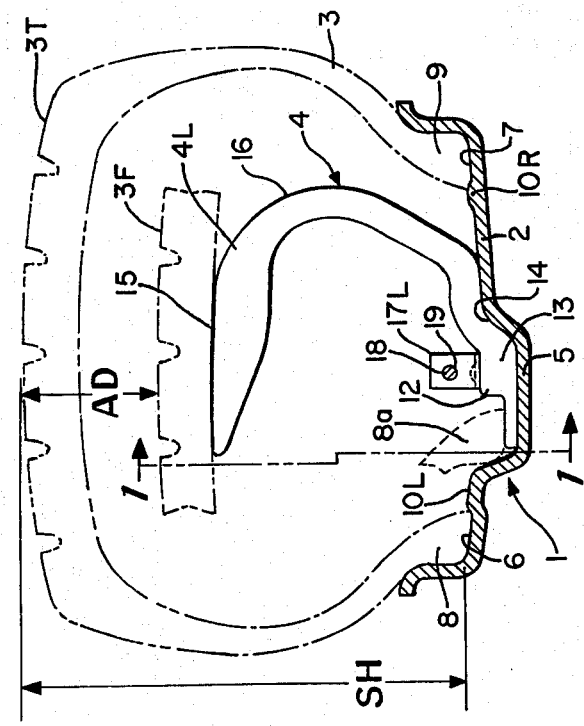
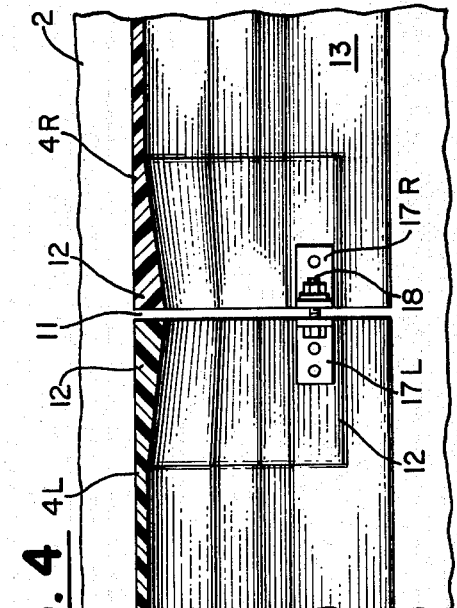
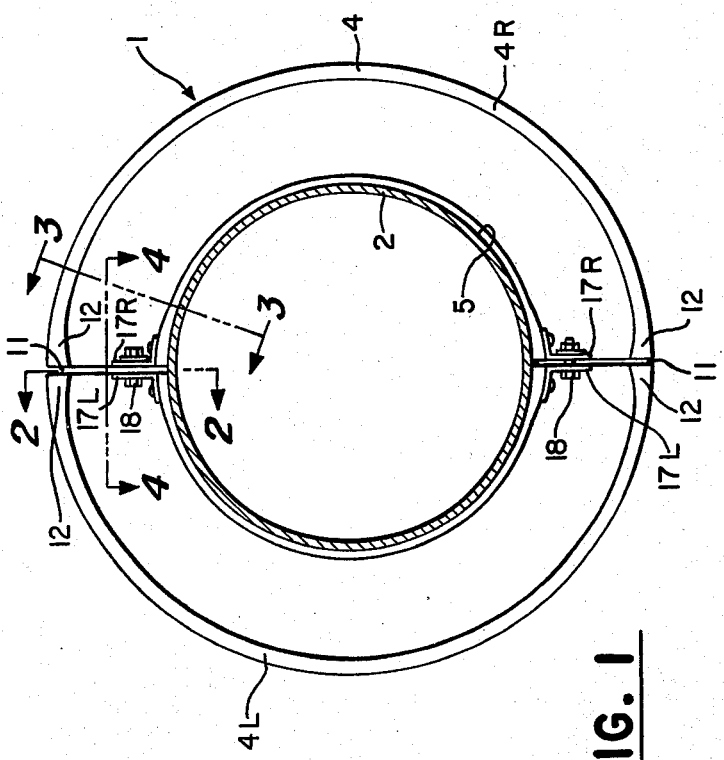
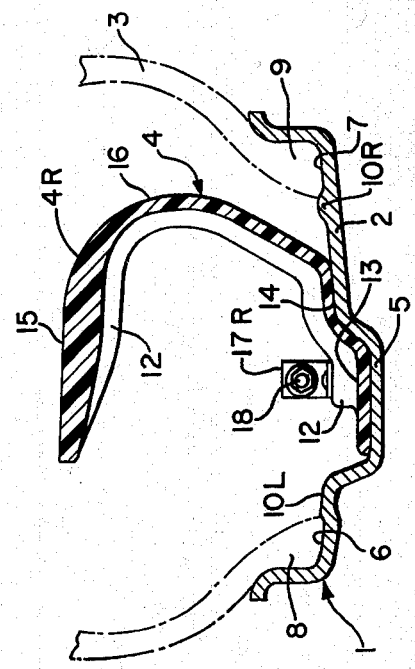
FIG. 1
FIG. 2
FIG. 3
FIG. 4

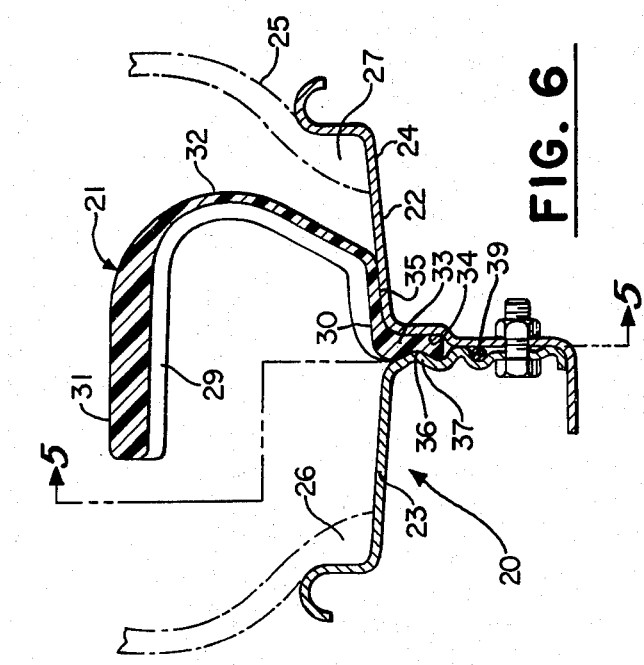
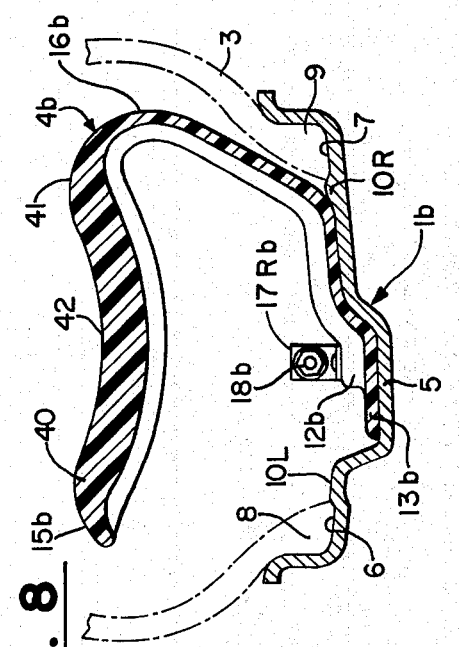
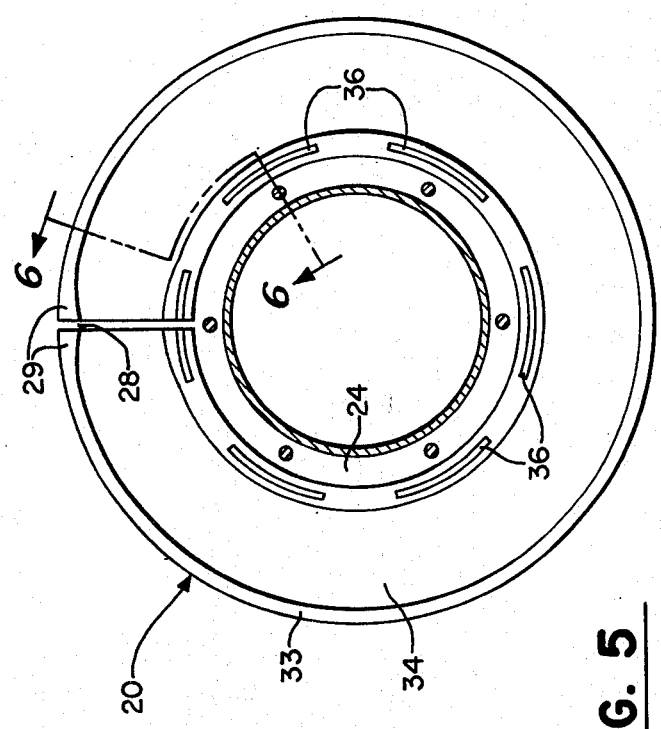
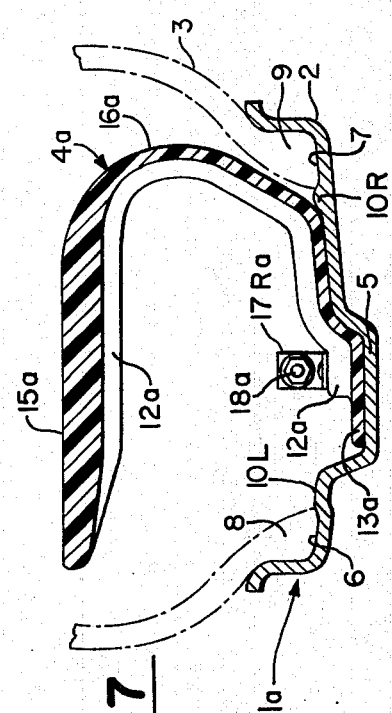

3,990,491

SAFETY SUPPORT DEVICE AND RIM FOR PNEUMATIC TIRES

This invention relates to a safety emergency insert device for use on a wheel rim inside a tire chamber to support the tire in a deflated condition.

BACKGROUND OF THE INVENTION

The pror art discloses a multitude of various types of devices for use on the inside of a tire to provide support of the tire in the delated or runflat condition. Many of these prior art devices are too heavy and create problems in maintaining a proper balance of the wheels. Others are difficult to fit inside of the tire. Some of the other problems encountered with the prior art devices are that they generate too much heat due to friction of the tire rubbing against the support device, they are too rigid and do not provide sufficient cushioning when the tire is running on the support device in a deflated condition and they do not support the tire in a stable condition but tend to permit too much lateral shifting of the tire.

BRIEF SUMMARY OF THE INVENTION

A safety device for use on a wheel rim having a pneumatic tire thereon to support the tire in a deflated condition. The device comprises an annular ring member mounted on a wheel rim inside the tire, the ring member comprising a rim-engaging portion, an axially extending tire tread support portion spaced radially outwardly from the rim-engaging portion for supporting a portion of the tire from the inside thereof when deflated, and a curved intermediate portion joining the rim-engaging portion with one lataral edge of the tire tread support portion, the tread support portion being radially deflectable when a radial load is applied thereto by a deflated tire thereby providing resilient support for the tire.

OBJECTS OF THE INVENTION

It is an object of this invention to provide a resilient lightweight device for supporting a deflated tire on a wheel rim. A further object of this invention is to provide a safety support device which may be easily positioned within a tire. Another object of this invention is to provide a safety support device which is simple in construction and easy to manufacture. These and other objects of the invention will become more fully apparent as the description proceeds in the following specification and the attached drawings.

BRIEF DESCRIPTION OF THE DRAWINGS

FIG. 1 is a cross-sectional view taken on line 1—1 of FIG. 2 showing a side elevation of one embodiment of the tire support device of the invention mounted on a rim;

FIG. 2 is a cross-sectional view taken on line 2—2 of FIG. 1 and showing the contour of a tire mounted on the rim;

FIG. 3 is a cross-sectional view taken on line 3—3 of FIG. 1;

FIG. 4 is a cross-sectional view taken on line 4—4 of FIG. 1;

FIG. 5 is a cross-sectional view taken on line 5—5 of FIG. 6 and showing a side elevation of a different embodiment of the tire support device from that shown in FIG. 1;

FIG. 6 is a cross-sectional view taken on line 6—6 of FIG. 5;

FIG. 7 is a cross-sectional view similar to FIG. 3 but showing a different embodiment of the invention;

FIG. 8 is a cross-sectional view similar to FIG. 3 but showing a still further modification of the invention;

DESCRIPTION OF THE PREFERRED EMBODIMENTS

Figure 10:
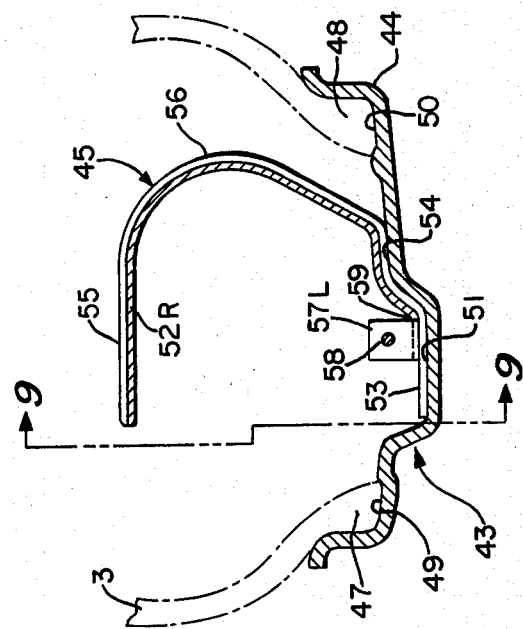
FIG. 10 is a cross-sectional view taken on line 9—9 of FIG. 9.

Referring now to FIGS. 1 and 2, an assembly 1 includes a vehicle wheel rim 2 having a pneumatic tire 3 mounted thereon and a tire support device 4 positioned within the chamber of the tire 3 and engaging the wheel rim 2. The wheel rim 2 as shown in FIG. 2 is a drop center type rim having a drop center portion 5 axially offset from the axial center of the rim with bead seat portions 6 and 7 on each side thereof for receiving tire beads 8 and 9 respectively of the tire 3. A pair of annular humps 10L and 10R are located axially inwardly of the bead seats 6 and 7 to prevent axially inward movement of tire beads 8 and 9.

In order to simplify the drawings, only a fragmentary portion of the tire 3 has been shown in chain-dotted line showing the two opposite beads 8 and 9. It should be understood, however, that the tire 3 can be any conventional type tire and hence it has not been shown in further detail. Although the relative position of the tire support device 4 in relation to the tire tread which it supports is not shown in the drawings, it should be understood that the spacing between the tire support device 4 and the tire tread should be sufficient that the tire will not come in contact with the tire support device under normal driving conditions including instances in which the tire hits bumps, chuckholes or other obstructions in the road which tend to deflect the tire radially inwardly. The tire would normally contact the tire support device 4 only under circumstances of substantial underinflation or deflation of the tire at which time the tire would bear against the radially outer surface of the support device 4.

The support device 4 is an annular ring having a substantially C-shaped cross section with the ring member being divided into two halves 4L and 4R by radial slots 11. Each half 4L and 4R is made as a single unitary piece preferably of a material such as fiberglass reinforced plastic, however other materials may be used if they have the required physical properties. For example, the support device may be made of plastic reinforced by a fiber such as poly (p-phenylen terephthalamide) sold by DuPont under the trademark "KEVLAR". The fibers may be in the form of a fabric or may be used randomly or oriented in some particular pattern within the plastic wall of the support device. In some instances unreinforced plastic may be used for the support device if it has proper physical properties.

The tire support device 4 is of substantially uniform thickness around the entire circumference except for a thickened portion 12 in the area of each adjacent end of both of the halves 4L and 4R of the support device 4. The purpose of the thickened portions 12 is to provide additional stiffness at the ends of the halves 4L and 4R to adjust the deflection rate in the area of the ends so that it is substantially the same as the deflection rate around the rest of the circumference of the support device 4. This is done because it is desirable to have a uniform deflection rate around the entire circumference of the support device 4 to prevent undesirable stress or vibration when a tire is supported by the device in a runflat condition.

FIG. 2 illustrates the appearance of one end of one of the halves of the support device 4 and FIG. 3 shows a section taken at a different location in one of the halves showing the thickness of the wall of the device 4 as it extends throughout most of the circumference and in addition, showing the thickness of the thickened portion 12.

In FIG. 4 is may be seen that the thickened portion 12 tapers from a greater thickness at the end of each half 4L and 4R to a progressively thinner cross section away from the end until it merges with the thickness of the wall which is present throughout the rest of the circumference of the support device 4. The thickened portion 12 may be made in various ways but in the illustration shown in FIGS. 1 through 4 when the device is made of fiber reinforced plastic, the thickened portion is merely built up by adding more fiberglass reinforced plastic in the area where the additional thickness is desired during the preform stage and then molding the device with the additional thickness of material in the desired area. The ends of the halves 4L and 4R may also be stiffened by bolting or riveting individual stiffeners to the halves 4L and 4R or by securing other stiffening members by adhesive or other suitable means. Regardless of the particular method used to stiffen the ends of the halves, the basic purpose is to provide uniform deflection rate throughout the entire circumference of the support member 4 and it is thereby necessary to provide such stiffness, otherwise the ends will have a greater rate of deflection than will the rest of the circumference of the support device 4.

The tire support device 4 has a rim-engaging base portion 13 which is shaped to fit into the drop center portion 5 of the rim 2 and to extend radially and axially outwardly and bear against a portion of a ledge 14 lying between the drop center portion 5 and the bead set portion 7 of the rim 2. The ledge 14 is formed as an extension of the bead seat portion 7 which is wider in the axial direction than the bead seat portion 6 because the drop center portion 5 is offset axially from the axial center of the rim 2. The ledge 14 provides additional axial support to the rim-engaging portion 13 and the manner in which the portion 13 extends into the drop center portion 5 prevents excessive axial movement of the support device 3 on the rim.

As shown in FIGS. 2 and 3 the thickened portion 12 terminates short of the edge of the rim-engaging portion 13 thereby providing a continuous annular clearance space to permit the tire bead 8 to be moved down into the drop center portion, as shown in FIG. 2 by the numeral 8a, during removal or mounting of the tire. In some instances it may be desirable to provide an annular filler ring or band, not shown, to fill or cover the clearance space and thereby prevent the tire bead 8a from moving into the clearance space if the tire should happen to move axially inwardly and pass over the hump 10L when the tire is running flat.

The support device 4 has an axially extending hoop shaped tire tread support portion 15, one axial edge of which is joined to the rim-engaging portion 13 by a curved intermediate portion 16. This configuration provides a cantilever support of the tire. The support portion 15 may be centered axially of the tire so that it supports a portion of the tire tread on each side of the axial center of the tread or ground contacting surface of the tire. In some instances, however, it may be preferable to position the support portion 15 so that it is not axially centered with respect to the tire tread. In each case, however, the support portion 15 should extend across the axial center of the tread.

It is also important that the support portion 15 is positioned radially at a proper location within the tire to provide the desired amount of allowable drop in the tire when running flat.

The allowable drop indicated by the letters AD shown in FIG. 2 determines the outer diameter of the support portion 15. A fragmentary portion of the tire tread 3T is shown in dotted lines in a flat condition designated as 3F and shown bearing against the support portion 15. A preferred range of allowable drop for a tire is between 30 to 60 percent of the section height of the tire, indicated in FIG. 2 by the letters SH. The section height SH is the distance measured radially of the tire from a bead base line to the radially outermost point on the tread 3T when the tire is inflated to design inflation pressure and unloaded. When some types of tire constructions are used, the range of allowable drop may be as broad as 20 to 80 percent of the section height of the tire. One limitation that must be taken into consideration, however, is that the outside diameter of the support portion 15 must be sufficiently small that the insert device, when placed in the tire, does not inhibit the mounting of the tire on the rim.

The curved intermediate portion 16 is spaced axially inwardly from the tire bead 9, but is in sufficiently close proximity thereto to prevent the tire bead 9 from moving axially inwardly from the hump a sufficient distance that the bead 9 is no longer in compression against the rim 2, which condition would permit rotation of the tire 3 on the rim. The bead 9, therefore, maintains firm engagement with the rim and provides a capacity to transmit torque and lateral forces between the tire and rim and thereby provide the desired handling and lateral stability in a runflat situation.

The support portion 15 as shown in FIG. 3 is thicker in cross section than the rest of the support device 4 to provide additional hoop strength and stiffness. The combination of the tire tread support portion and the curved intermediate portion 16 which supports the tread support portion 15 on one lateral edge thereof permits the support portion 15 to deflect when it is subjected to a static or dynamic load while supporting a tire in a runflat condition. The amount of deflection can, of course, be increased or decreased by changing the thickness of the wall, particularly in the area of the portions 15 and 16 or by modifying the physical properties of the material, and to some degree by changing the contour of the curvature of the portion 16. A larger radius of curvature normally provides greater deflection of the portions 15 and 16. The unsupported edge of the portion 15 is normally capable of greater deflection than the supported edge connected to the curved portion 16.

A tab 17L is fastened on each end of the half 4L by rivets or other means and is so positioned to mate with similar tabs 17R on the half 4R. After the two halves have been placed inside a tire and the tire has been positioned on a conventional drop center rim, the two halves may be joined together by bolts 18 passing through aligned holes 19 in the tabs 17L and 17R, each bolt being secured by a nut and lock-washer. Other means such as latches and the like may also be used for securing the two halves together. Thus the halves 4L and 4R are secured together to form an annular ring member which is the support device 4. After the halves 4L and 4R have been fastened together, the rim-engaging portion 13 should remain securely in the drop center portion 5 of the rim 2 and should not move in either the circumferential or axial direction.

A different embodiment is shown in FIGS. 5 and 6 in which the overall assembly 20 comprises a tire support device 21 mounted on a split rim 22 having halves 23 and 24. A tire 25 having beads 26 and 27 is mounted on the rim 22. Since the tire support device 21 is used in the present embodiment with a split rim, it need not be made in two separate halves such as the halves 4L and 4R in the embodiment shown in FIG. 1. Instead, the tire support portion 21 is made as a one-piece annular ring member having one radial split 28 passing through the entire cross section of the support device 21. By having the member 21 split at 28, the ends of the device can be deflected axially with respect to each other to permit it to pass through the bead of a tire in which the device is to be used. The support member has thickened portions 29 on each side of the split 28 to provide additional stiffness in the same manner as that provided in the embodiment shown in FIGS. 1 through 4 as previously described. Similar to the support device 4 the device 21 has a rim-engaging portion 30, an axially extending tire tread support portion 31 and a curved intermediate portion 32 joining the rim-engaging portion 30 and one lateral edge of a tire tread support portion 31.

The rim-engaging portion 30 comprises a radially inwardly extending flange 33 which fits into a radially outwardly extending channel 34 formed between the two halves 23 and 24 of the split rim and an axially extending portion 35 which rests on the radially outer surface of the rim half 22. The flange 33 of rim-engaging portion 30 has a series of circumferentially spaced apart grooves 36 which mate with a series of similar circumferentially spaced part ribs 37 located in the channel 34 on the half 23 of the split rim 22. These mating grooves 36 and ribs 37 aid in retaining the flange 33 in the channel 34 and prevent relative circumferential movement between the support device 21 and the rim 22.

After the device 21 has been placed inside a tire, the tire is then mounted on the rim 22 and the halves 23 and 24 of the rim are bolted together by a series of bolts 38. The halves of the rim are suitably sealed together by an O-ring 39 which prevents escape of air from a tire chamber between the rim halves. Because of the manner in which the support device 21 is mounted in the rim 22, there is no need for clips like the clips 17L and 17R that are used on the support device 4 in FIGS. 1 through 4.

FIG. 7 shows an embodiment substantially the same as the embodiment shown in FIGS. 2 and 3 and hence all the parts will bear the similar numerals except that the tire support device will be identified by the numeral 4a and all the various members of the device 4a will bear the suffix a to differentiate this structure from that shown in FIGS. 1 through 4. The main difference in the embodiment identified as 4a from the support device 4 is that the tire tread support portion 15a is much wider in the axial direction and supports a larger portion of the tire tread. In addition, the contour of the curved intermediate portion 16a is modified to properly support the wider tread support portion 15a. The wider area of support may be preferable in some instances since it provides more stability to the tire and better handling characteristics. When the intermediate portion 16a is sufficiently close to the bead 9 of the tire 3, it assists the hump 10R in preventing axial inward movement of the bead 9.

Another variation is illustrated in FIG. 8 in which a tire tread support portion 15b, when viewed in cross section, is contoured concavely on the radially outer surface in such manner as to have two raised axially spaced apart tread support surfaces 40 and 41 separated by a center circumferential depression 42. This embodiment may be useful due to the particular nature of certain tyes of tires with which it may be used. In some instances it may be more desirable to support the outer edges of the tread near the shoulder rather than supporting the center of the tire or supporting substantially the entire width of the tread. In other instances where center support of the tire is desired, the tire tread support section 15b can instead be curved convexly on the radially outer surface and thereby provide a support surface contoured to more closely follow the curvature of the inner surface of the tire beneath the tread. Whether or not one uses the center support, the entire width support or the shoulder support will depend upon the particular characteristics of the tire and the various design criteria which must be taken into consideration for a particular vehicle on which the tire and support device is being used.

Figure 9:
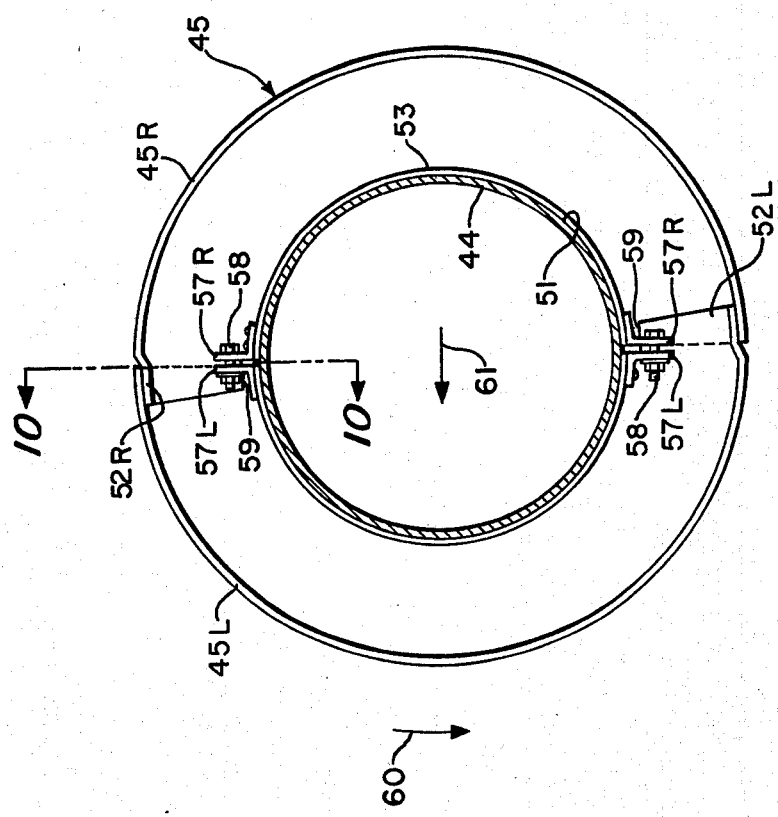
FIG. 9 is a cross-sectional view taken on line 9—9 of FIG. 10 showing a side elevation of an embodiment of the invention with the tire support device made of steel.

FIGS. 9 and 10 show an embodiment similar to that shown in FIGS. 1 through 4 except that the tire support device is made from spring steel or other suitable metal instead of fiberglass reinforced plastic. In FIGS. 9 and 10 the assembly 43 has a drop center type wheel rim 44 with a tire support device 45 mounted thereon inside a tire 46. The tire 46 has beads 47 and 48 mounted on bead seats 49 and 50 respectively on the rim 44 on each side of a drop center portion 51. The support device 45 is made in two halves 45L and 45R which fit together to form an annular ring. One end of the half 45R has a radially inwardly offset portion 52R which fits inside of the adjacent end of 45L in overlapping relationship therewith. Likewise, one end of the half 45L has a similar radially inwardly offset portion 52L which fits inside of the adjacent end of 45R in overlapping relationship therewith.

The support device 45 in cross section has a rim-engaging portion 53 which fits into the drop center portion 51 and rests on ledge 54 adjacent thereto, an axially extending hoop shaped tire tread support portion 55 and an intermediate curved portion 56 joining the rim-engaging portion 53 and the tire tread support portion 55. This arrangement, like that shown in FIGS. 1 through 4, provides a cantilever type action in which the tread support portion 55 flexes radially inwardly when subjected to radial loads during a runflat situation. The overlap of the ends of the halves 45L and 45R at offset portions 52R and 52L serves to provide additional support at the ends and reduce the flexing of the device 45 to provide more uniform flexibility throughout its circumference. This same function could also be accomplished by adding stiffening members to the ends such as was done in the previously described embodiments instead of overlapping the ends.

Each of the ends have brackets or tabs 57L and 57R riveted to the rim-engaging portion 53 adjacent the edge of each end. A bolt 58 fastens together each pair of adjacent tabs 57L and 57R to hold the halves 45L and 45R together around the rim 44. Each end has a cut-away portion 59 on the offset 52R and 52L to permit the tabs 57L and 57R to come into close proximity to each other for bolting together.

When the ends of the support device are overlapped such as shown in FIGS. 9 and 10, the support is provided by the overlap only if the wheel and the support device 45 is rotating in the direction shown by the arrow 60 and the vehicle using the device is moving in the direction shown by the arrow 61. In other words, the end lying radially outwardly of the offsets 52R and 52L must receive the force load first in order to receive support from the radially inwardly positioned overlapped portions. If the ends having the radially inwardly positioned offsets receive the force load first, they are unsupported by the adjacent overlapped end.

Regardless of whether one uses the type of tread support portion shown in FIGS. 2 and 3 or in FIGS. 7, 8 or 10, one of the primary considerations is that the device be uniformly resilient around the circumference thereof to provide uniform deflection when the tire is being supported by the device thereby eliminating undesirable bumpiness or vibration that would otherwise occur. Thus it may be seen that one of the basic concepts used herein is the use of the cantilever type support which permits the desired deflection of the tread support member which is designed to provide sufficient stiffness to adequately support the tire and yet allow the desired deflection for shock absorption.

Figure 11:
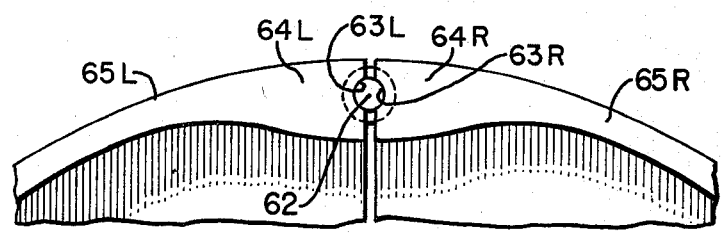
FIG. 11 is a fragmentary side elevational view showing a round pin keying together the opposed ends of two ring halves of the invention.
Figure 12:
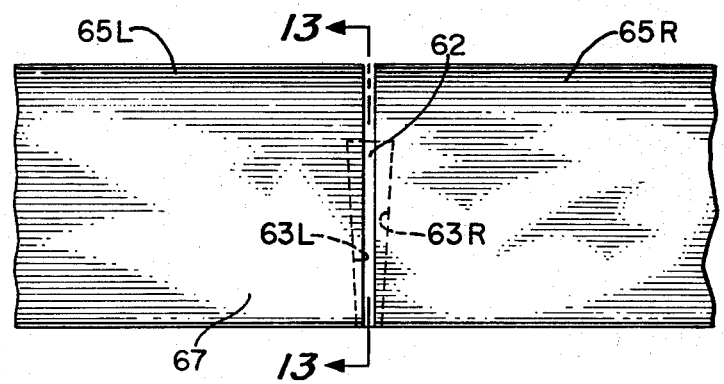
FIG. 12 is a fragmentary top plan view of the embodiment shown in FIG. 11.
Figure 13:
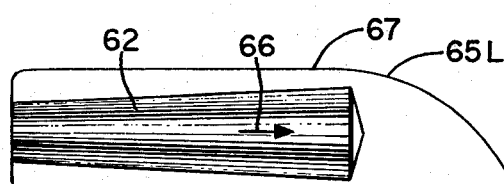
FIG. 13 is a fragmentary cross-sectional view taken on line 13—13 of FIG. 12.
Figure 14:
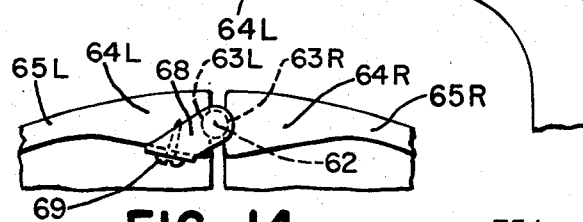
FIG. 14 is a fragmentary side elevational view similar to FIG. 11 but showing a clip to hold the pin in position for keying together the ends of two ring halves of the invention.
Figure 15:
FIG. 15 is a perspective view of the clip shown in FIG. 14.

In addition to stiffening the ends of the ring member halves by thickening the ring cross section as shown adjacent the ends as shown in FIGS. 1 through 8, the ends may be keyed together to provide more uniform radial deflection as shown in FIGS. 11 through 13 or in FIGS. 14 and 15.

In FIGS. 11 through 13 a round tapered pin 62 is shown positioned in a pair of opposed tapered grooves 63L and 63R in thickened end portions 64L and 64R respectively of ring halves 65L and 65R. The ring halves 65L and 65R are similar to the halves 4L and 4R in FIGS. 1 through 4. Because of the longitudinal taper of the pin 52 and grooves 63L and 63R, the pin 62 will tend to move axially in the direction of arrow 66 toward the supported end of the flange 67 and will, therefore, remain in position to provide support of the end portions 64L and 64R for uniform deflection. Instead of the round pin 62, pins of rectangular or diamond cross section or other cross-sectional shapes may also be used to key the ends of the ring halves together.

In FIG. 14, a view similar to FIG. 11, the retaining clip 68 of FIG. 15, is shown attached to the thickened end portion 64L of ring half 65L by screws 69 in such a position to overlap the end of pin 62 to assure that the pin 62 does not move axially out of the grooves 63L and 63R. The clip 68 is needed with an untapered pin or possibly one with a very small taper.

Figure 16:
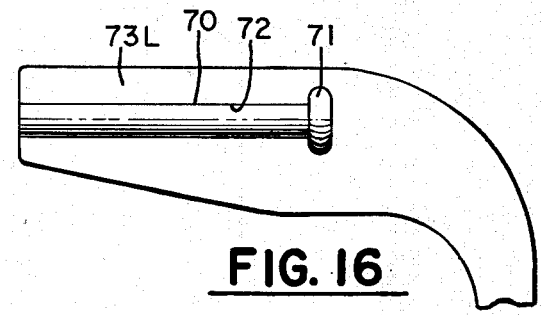
FIG. 16 is a fragmentary cross-sectional view similar to FIG. 13 but showing a different type pin.

FIG. 16 is a view similar to FIG. 13 but showing an untapered pin 70 having an enlarged head 71 to prevent it from moving axially out from between the ring halves. The pin 70 in FIG. 16 is mounted in a groove 72 in the left half 73L of a support ring.

Figure 17:
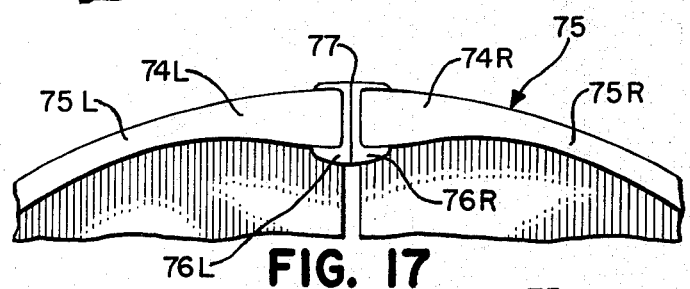
FIG. 17 is a fragmentary side elevational view similar to FIG. 11 but showing a different embodiment of the invention.
Figure 18:
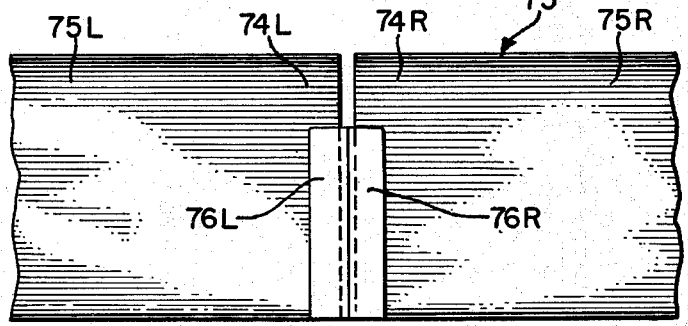
FIG. 18 is a fragmentary top plan view of the embodiment shown in FIG. 17.

FIGS. 17 and 18 illustrate a means of limiting relative movement between thickened end portions 74L and 74R of ring halves 75L and 75R respectively. Edge strips 76L and 76R of polyurethane are cast in place on the thickened end portions 74L and 74R respectively. The opposed surfaces of strips 76L and 76R contact each along a line 77. As a wheel running on a flat tire is being supported by the ring halves 75L and 75R of ring 75, the intimate contact between edge strips 76L and 76R provides frictional resistance to relative radial movement of the halves 75L and 75R with respect to each other and thereby provides a deflection rate at the ends 74L and 74R which is similar to that present throughout the rest of the halves. In other words, the polyurethane edge strips 76L and 76R cooperatively function to serve a purpose similar to the pin 62 and, in effect, key the ends of the ring halves 75L and 75R together. The strips 76L and 76R are cast in such manner that they overlap both the radially inner and outer surfaces of the ring halves 75L and 75R, however, as shown in FIG. 17, the portions overlapping the radially outer surface of 75L and 75R are very thin so that a relatively smooth outer surface is provided without any bumps which would cause vibration when the ring member 75 is supporting a flat tire.

Figure 19:
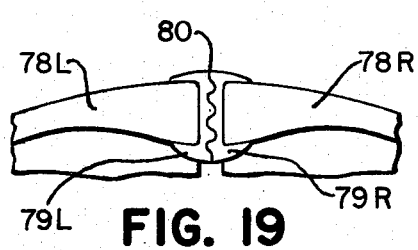
FIG. 19 is a fragmentary side elevational view similar to FIG. 17 but showing another modification of the invention.

Another variation of the embodiment shown in FIGS. 17 and 18 is shown in FIG. 19 in which polyurethane edge strips 79L and 79R are cast onto ends 78L and 78R. The strips 79L and 79R differ from 76L and 76R, however, in that their opposed contacting edges have mating ribs and grooves, thereby providing in cross section a curved line of contact 80 which serves to key together the two strips 79L and 79R and prevent relative radial movement between them. While the edge strips 76L 76R, 79L and 79R are shown as made of polyurethane, they may also be made of any other material having the required physical properties.

Figure 20:
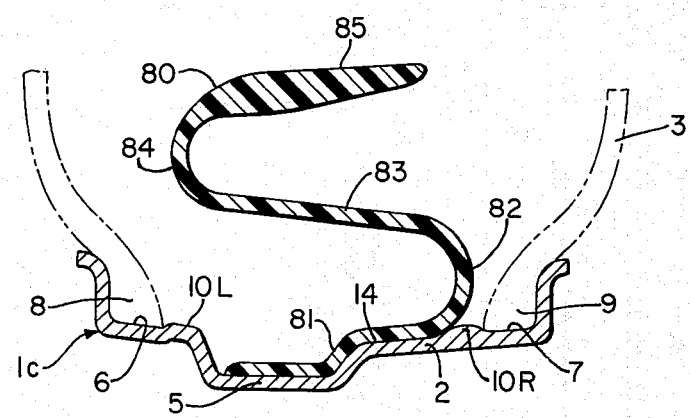
FIG. 20 is a cross-sectional view similar to FIG. 3 but showing a different embodiment of the tire support device.

FIG. 20 shows an assembly 1c which has a tire support device 80 of substantially "S" shaped cross section mounted on a rim 2 identical to that in FIG. 3. For simplicity, the identical parts bear identical numerals to those in FIG. 3. The tire support device 80 is mounted on the rim 2, which part of a rim-engaging portion 81 extending into a drop center portion 5 and the rest of the portion 81 being contoured so that it bears against a raised ledge which is an extension of the bead seat 7. The relationship of the rim-engaging portion 81 is similar to that previously described regarding the embodiment in FIG. 3. One lateral edge of the portion 81 merges with a first curved portion 82 which in turn merges with an intermediate annular portion 83 which is straight in the transverse or axial direction.

The portion 83 merges with a second curved portion 84 which curves in the opposite direction to the portion 82 and merges with one axial edge of an axially extending tire tread support portion 85. The support portion 85 deflects axially when supporting a flat tire in a manner similar to the other embodiments.

Figure 21:
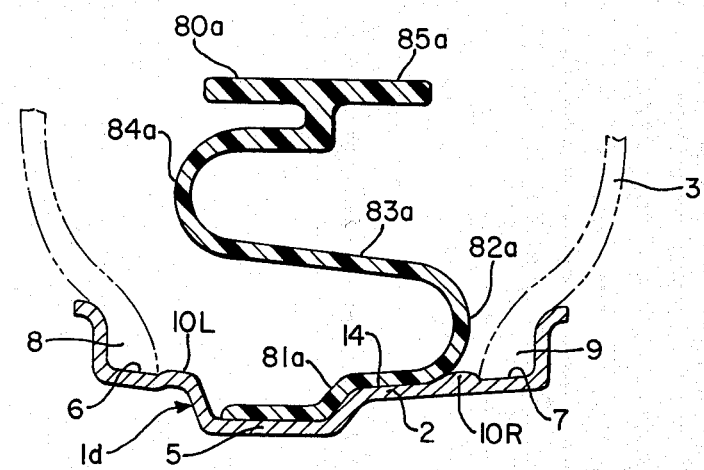
FIG. 21 is a cross-sectional view of another embodiment of the tire support device.

FIG. 21 shows a tire support device 80a similar to the S shaped device 80 in FIG. 20, except that it has a tire tread support portion 85a which is supported at the axial center thereof rather than at one axial edge. A rim contacting portion 81a merges with a first curved portion 82a which merges with transverse portion 83a. Portion 83a merges with a second curved portion 84a which in turn connects to the axial center of the tread support portion 85a. Both the device 80 and 80a are quite similar except for the different location of attachment of the tread support portions 85 and 85a.

Figure 22:
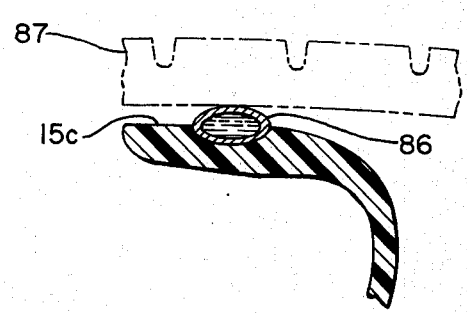
FIG. 22 is a fragmentary cross-sectional veiw showing a lubricant reservoir on a tire support device.

FIG. 22 shows a tire tread support portion 15c which is similar to the portion 15 in FIG. 3, except that it has a lubricant reservoir 86 mounted on the radially outer surface of the portion 15c and being contacted by a flat tire 87. Pressure and friction of the tire 87 causes the reservoir to burst and release lubricant to provide lubrication of the support device and the inside of the tire and thereby reduce heat generated by friction between the tire and support device. Such lubricant can be provided with any of the embodiments of support device shown herein.

It should be understood that this concept can be applicable to various types of rims and the rim-engaging portion can be modified in various ways to fit the various types of rims on which the device is to be used. These and other modifications may be made in the device shown herein without departing from the scope of the invention.

What is claimed is:

1. A safety support device for use on a wheel rim having a pneumatic tire thereon to support the tire in a deflated condition, the device comprising:
   A. an annular ring member having at least one split extending radially therethrough and further including means to modify the deflection of the ends of the ring member to adjust the deflection rate in the area of the split so that it is substantially the same as the deflection rate throughout the rest of the circumference of the ring member, said ring member being mountable on a rim and further comprising:
      1. a rim-engaging portion,
      2. an axially extending tire tread support portion spaced radially outwardly from the rim-engaging portion for supporting a portion of the tire tread on both sides of the axial center of the tread from the inside thereof when deflated,
      3. a deflectable intermediate portion which is curved as viewed in sections containing the rotational axis of the rim joining the rim-engaging portion with one lateral edge of the tire tread support portion for resiliently supporting the tread support portion, and
      4. the tread support portion being radially deflectable when a radial load is applied thereto when the tread support portion is contacted by a deflated tire, thereby providing resilient support for the tire.

2. A safety support device as claimed in claim 1 wherein the rim-engaging portion has an axially extending annular band which fits into and encircles the periphery of the drop center portion of a drop center type rim.

3. A safety support device as claimed in claim 1 wherein the means to modify the deflection of the ends of the ring member comprises a thickened portion at each end of the ring.

4. A safety support device as claimed in claim 3 wherein the thickened portion at each end of the ring is thickest at each end of the ring and tapers to a thinner cross section until it is the same thickness as the ring member around the rest of its circumference.

5. A safety support device as claimed in claim 1 wherein the means to modify the deflection of the ends of the ring member comprises overlapping portions of the ring at the ends in the circumferential direction.

6. A safety support device as claimed in claim 1 wherein the means to modify the deflection at the ends of the ring member comprises a key member extending transversely across the tire tread support portion and simultaneously engaging and matching with a transverse groove in each of the opposed ends of the ring.

7. A safety support device as claimed in claim 6 wherein the key member comprises a pin which is tapered in longitudinal cross section thereof, the largest diameter end of the pin being located nearest the part of tread engaging portion which joins with the curved intermediate portion.

8. A safety support device as claimed in claim 1 wherein the means to modify the deflection comprises a pair of opposed edge strips, each strip being attached to one of the opposed ends of the ring member and having a surface in intimate frictional contact with a similar surface on the other strip to limit the relative radial movement of the opposed ends with respect to each other when the ends are subjected to radial loads.

9. A safety support device as claimed in claim 1 wherein the tire tread support portion is of a width to provide support for the tire tread at the axial center thereof.

10. A safety support device as claimed in claim 1 wherein the tire tread support portion is of sufficient width to provide support across a major portion of the axial width of the tire tread.

11. A safety support device as claimed in claim 1 wherein the tire tread support portion is of sufficient width to extend substantially across the entire width of the tread and wherein said tread support portion has a radially inwardly extending depression in the lateral center thereof so that the tire tread is supported adjacent each lateral edge thereof.

12. A safety support device as claimed in claim 1 wherein the intermediate portion is spaced from the adjacent bead of the tire mounted on the rim but in sufficiently close proximity to prevent substantial axially inward movement of the adjacent bead on the rim and thereby maintain firm engagement between said bead and the rim.

13. A safety support device for use on a wheel rim having a pneumatic tire thereon to support the tire in a deflated condition, the device comprising:
A. a single annular ring member of substantially C-shaped cross section positioned on a wheel rim inside the tire at substantially the axial center of the tire chamber;
B. the open portion of the C-shaped ring facing toward one sidewall of the tire as viewed in cross section when the ring member is positioned in operative position on the rim;
C. said ring member being radially deflectable when a radial load is applied thereto by a deflated tire;
D. said ring member having at least one radial split extending therethrough to permit the ring to be deflected to enable it to pass through the bead of a tire and means fastening together the ends of the ring member after it is positioned within a tire; and
E. means to adjust the deflection rate in the area of the split so that it is substantially the same as the deflection rate throughout the rest of the circumference of the ring member.

14. A safety support device as claimed in claim 13 wherein the means to adjust the deflection rate in the area of the split comprises means for stiffening the ends of the ring member including a thickened portion of the wall adjacent the ends.

15. A safety support device as claimed in claim 14 wherein the thickened portion of the wall tapers progressively to a thinner portion in a circumferential direction away from each end of the ring.

16. A safety support device as claimed in claim 14 wherein the means to adjust the deflection rate in the area of the split is an overlap of one end of the ring member with another end of the ring in the area of the split.

17. A safety support device as claimed in claim 16 wherein the means to adjust the deflection rate in the area of the split is to provide a key member extending between the opposed ends of the annular ring member and simultaneously engaging both ends.

18. A safety support device as claimed in claim 17 wherein the means to adjust the deflection rate in the area of the split is to provide a pair of opposed edge strips with one of the edge strips being fastened to one of the opposed ends of the ring member, and having a surface in intimate frictional contact with a similar surface on the other strip to limit the relative radial movement of the opposed ends with respect to each other when the ends are subjected to radial loads.

19. A safety support device as claimed in claim 17 wherein the key member is a pin which is tapered in the longitudinal direction and which engages a groove in each of the opposed ends of the ring member.

20. A safety support device as claimed in claim 17 wherein the key member is a round pin with an enlarged bead which pin engages a groove in each of the opposed ends of the ring member, the enlarged bead preventing axial movement of the pin in the grooves.

21. A safety support device as claimed in claim 13 wherein the ring member has two radial splits at diametrically opposite locations around the circumference of the ring thereby dividing the ring into two separate semicircular members and including means to fasten together the two pairs of adjacent ends and means to stiffen both ends of each of the two members to adjust the deflection rate adjacent the ends so that it is substantially the same as throughout the rest of each semicircular member.

22. A safety support device as claimed in claim 13 wherein the lower portion of the C-shaped ring member fits into the drop center portion of a drop center type rim.

23. A safety support device as claimed in claim 13 wherein the lower portion of the C-shaped ring member has a flange which extends radially inwardly between two halves of a split wheel rim.

24. A safety support device as claimed in claim 13 wherein the ring member is made of metal.

25. The combination of claim 24 wherein the depressed annular portion is offset from the axial center of the rim.

26. A safety support device as claimed in claim 13 wherein the ring member is made of reinforced plastic.

27. The combination of a wheel rim having a pneumatic tire thereon and a safety support device mounted on the rim within the tire to support the tire in a deflated condition comprising:
A. a drop center type wheel rim comprising:
 1. a pair of axially spaced bead seats for receiving the beads of a tire mounted on the rim,
 2. an annular side flange extending radially outwardly of each bead seat to retain the tire beads on the rim,
 3. a depressed annular portion located between the bead seats,
 4. an annular raised ledge extending from at least one lateral edge of the depressed portion to one of the bead seats;
B. an annular support ring member comprising:
 1. a rim-engaging portion having:
  a. a first annular portion fitting into the depressed annular portion of the rim, and
  b. a second annular portion extending from one lateral edge of the first annular portion and bearing against the annular raised ledge,
 2. tire tread support means extending radially outwardly from the second annular portion of the rim-engaging portion to a position radially outwardly of the side flanges of the rim and radially inwardly of the inside surface of the tire beneath the tread and having means to support the tread on both sides of the axial center in a runflat condition, and
 3. at least one radial split extending through said ring member to permit the ring to be deflected to enable it to pass through the bead of the tire, means fastening together the ends of the ring member after it is positioned in the tire, and means to adjust the deflection rate in the area of the split so that it is substantially the same as the deflection rate throughout the rest of the circumference of the ring member.

28. The combination of claim 27 wherein the support ring member comprises a plurality of arcuate segments joined together with each segment being of unitary construction from a deflectable material.

29. The combination of claim 27 wherein the tire tread support means is supported by the rim engaging portion along one lateral edge thereof to provide a deflective cantilever support of the tire when it is running flat.

30. The combination of claim 27 wherein the tire tread support means comprises a deflectable hoop portion connected to the rim-engaging portion by a radially extending intermediate portion.

31. The combination of claim 28 wherein intermediate portion is spaced axially inwardly of the tire bead but in sufficiently close proximity thereto so as to prevent the axial inward movement of the bead to a position on the rim of such a smaller diameter that the tire will rotate with respect to the rim.

* * * * *